(12) United States Patent
Grassi et al.

(10) Patent No.: US 9,409,747 B2
(45) Date of Patent: Aug. 9, 2016

(54) ELECTRONIC DEVICE COVER WITH RETRACTABLE COMMUNICATION MODULES

(76) Inventors: Nicole Rachelle Grassi, Boynton Beach, FL (US); Adam Michael Ludwin, Boynton Beach, FL (US)

(*) Notice: Subject to any disclaimer, the term of this patent is extended or adjusted under 35 U.S.C. 154(b) by 292 days.

(21) Appl. No.: 13/541,712

(22) Filed: Jul. 4, 2012

(65) Prior Publication Data

US 2013/0020425 A1    Jan. 24, 2013

Related U.S. Application Data

(60) Provisional application No. 61/510,880, filed on Jul. 22, 2011.

(51) Int. Cl.
*B65H 75/44* (2006.01)
*B65H 75/48* (2006.01)
*H02G 11/02* (2006.01)

(52) U.S. Cl.
CPC ............ *B65H 75/4431* (2013.01); *B65H 75/48* (2013.01); *H02G 11/02* (2013.01); *B65H 2701/3919* (2013.01)

(58) Field of Classification Search
USPC .............. 242/371, 372, 376, 378, 378.4, 349, 242/385, 385.4, 378.1, 388.6, 388.7
See application file for complete search history.

(56) References Cited

U.S. PATENT DOCUMENTS

| | | | | |
|---|---|---|---|---|
| 6,019,304 | A * | 2/2000 | Skowronski et al. | 242/373 |
| 6,434,249 | B1 * | 8/2002 | Wei | 381/370 |
| 6,712,304 | B1 * | 3/2004 | Taylor | 242/379 |
| 6,834,820 | B2 * | 12/2004 | Wei | 242/378 |
| 2004/0159734 | A1 * | 8/2004 | Wei | 242/376 |
| 2011/0284676 | A1 * | 11/2011 | Taketsuna | 242/378.4 |
| 2012/0138725 | A1 * | 6/2012 | Chen et al. | 242/378.1 |
| 2012/0153065 | A1 * | 6/2012 | Fischer | 242/379 |

FOREIGN PATENT DOCUMENTS

WO    WO 2010079656 A1 *    7/2010    ............. B65H 75/48

* cited by examiner

*Primary Examiner* — Emmanuel M Marcelo
*Assistant Examiner* — Justin Stefanon
(74) *Attorney, Agent, or Firm* — The Concept Law Group, P.A.; Scott D. Smiley; Erin A. Martin

(57) ABSTRACT

An electronic device cover provides a protective cover for an electronic device and also extends and retracts a plurality of audio and data transfer modules at varying speeds and lengths. The electronic device cover is configured and shaped to receive myriad types and models of electronic devices. A proximal end of a communication cord extends from the electronic device cover to provide communication modules such as ear buds, or head phones to a user. A distal, shorter end of the same cord extends more slowly and at a slower speed from a different end of the electronic device cover to provide connections to the more proximal electronic device, power sources, and other electronic ports. The cords extend at different speeds and lengths due to a differential affect.

19 Claims, 8 Drawing Sheets

ELECTRONIC DEVICE COVER WITH RETRACTABLE COMMUNICATION MODULES

FIELD OF THE INVENTION

The present invention relates generally to a cover for an electronic device; and more particularly relates to a protective cover of an electronic device that extends and retracts a plurality of audio and data transfer modules at varying speeds and lengths through the use of internal differentials.

BACKGROUND OF THE INVENTION

Portable electronic devices, such as, but not limited to, cell phones, audio/video players, and tablets are and have been significantly increasing in popularity and in technological advances over the past couple of decades. As the popularity of the devices increase, so does the demand and competitive edge for those manufacturers of those devices. Most electronic devices, such as those described above, are also capable of playing audio signals, i.e. playing music, streaming video, or listening to audio books. Many users of these electronic devices desire to hear the audio through headphones in order to hear the audio better and not to disturb those persons in the relative proximity. As such, most of these devices have external audio inputs. Most headphones require the user to carry them around and connect headphones to these devices when needed. Consequently, the user is required to remember to bring the head phones and then detach them when finished and separately store and carry them, which can be cumbersome, inefficient, and can damage the head phones when transporting them.

To solve the above-described problems and to protect the audio devices, some known cases that hold an electronic device, and the casing of the electronic device itself, include some or the entire headphone assembly, including the earphone, cord, and audio connector. To store the cord on the aforementioned cases or casings, hereinafter "case(s)," the user generally has to wrap or store the cord for these headphones on the outside surface of the case, which inefficiently requires the user to physically unwrap the cord when use is desired, is not aesthetically pleasing, and still leaves the head phone assembly subject to damage while in transport.

Therefore, a need exists to overcome the problems with the prior art as discussed above.

SUMMARY OF THE INVENTION

This invention is directed to an electronic device cover with extending and retracting communication modules. The electronic device cover provides a protective cover for an electronic device and also extends and retracts a plurality of audio and data transfer modules at varying speeds and lengths. The housing is configured to receive and hold a plethora of electronic devices, such as portable devices used to download and play music, portable digital electronic devices used to send and receive phone calls, personal digital assistant devices, and the like. The housing easily engages with, and extricates from, the electronic device by sliding, clamping, or utilizing fasteners. The housing can be of soft rubber-like or a rigid material such as plastic, aluminum, polycarbonate, or any other material of similar extrusion that protects from physical damage due to hard physical contact, water, contaminants, corrosion and the like. The housing may also have a soft rubber-like liner to hold the device in the cover without shifting. It will be pliable for device insertion and provide an additional level of protection through shock absorption beyond the rigid outer shell. The electronic device cover is also utilized for storing, extending, and retracting cords, which are substantially stored in the housing. A cover affixes to the housing to protect the cords. Each cord being protected therein includes a cord distal end and a cord proximal end, where the cord distal end represents one extreme of the cord and includes a distal communication module, such as a headpiece, an earphone, two earphones, a small headset, headphones with small microphone so a user can answer calls, and the like. On the other extreme of the cord, the proximal end of the cord includes a proximal communication module such as an energy source coupling device or an electronic device coupling device, such as a jack, socket plug, USB connection, and the like. In one embodiment, there are two separate cords in the electronic cover device, each cord having a cord distal end and a cord proximal end, and each cord extending and retracting at different angular velocities and lengths.

A cord winding differential member, which is positioned inside the housing, allows the cord proximal end and the cord distal end to extend and retract at varying angular velocities. This is possible because of a couple of structural differential embodiments, which are described herein.

Because both the cord distal end and the cord proximal end belong, in essence, to the same cord, their extensions and retractions must be coordinated. For example, extension of the cord distal end must allow the cord proximal end to also extend so that the headphone can reach the user's ears and the jack can simultaneously reach the electronic device. Also, there might be a torque force that creates tension for urging both ends of the cord back to their fully retracted position in the cord winding differential member. This coordinated movement is accomplished through the differential mechanics of one or more axial pins, and a spiral torsion member that coils around the axial pin, urging it back to a fully retracted position around the cord winding differential member. Furthermore, an inner hook attaches to the axial pin to secure the spiral torsion member to the axial pin.

In accordance with another feature, an embodiment of the present invention includes, a second cord winding differential member positioned inside the housing having a cord distal end with a USB connector, and a cord proximal end with a USB port. The second cord can be utilized to incorporate a built in retractable recharging or communication interface such as a USB interface to charge or transfer data to the electrical device. Those skilled in the art can appreciate that there are other variations of cables, connectors, and communications protocols used in a bus for connection beyond USB's, such as cable plugs, host interface receptacles, mini and micro connectors, and any other connectors now known or later developed.

In accordance with a further feature of the present invention, a switch operatively attaches to the cord winding differential member to allow the user to stop extensions and retractions of the cord by manipulating the switch from the housing exterior.

In accordance with a further feature of the present invention, a communication module cavity formed in the housing provides a concealable, external storage area for the cord proximal end and the cord distal end along the surface of the electronic device cover. Headphones, headphone jacks, and various similar connectors store flush inside the communication module cavity.

In accordance with a further feature of the present invention, the electronic device cover comprises a plug attached to the cord, so that positioning the electronic device into the housing operatively connects the plug to a socket in the electronic device, wherein the electronic device operatively connects to the distal communication module and the proximal communication module.

In accordance with yet another feature of the present invention, in place of a second winding differential member, a tortuous groove is located inside the housing. The tortuous groove is fabricated within the housing construct and utilized to store the cord. The tortuous groove comprises of a groove distal opening and a groove proximal opening where the respective communication modules are positioned for easy accessibility. The tortuous groove further includes a plurality of cord restraining members positioned along the length of the tortuous groove for restraining the cord securely. The cord restraining members act as teeth to hold the cord. The cord distal end and the cord proximal end extend from and retract into the tortuous groove with enough resistance to prevent them from loosely falling out of the housing.

In another aspect, in operation, the electronic device cover is first inspected to verify that it is the appropriate model, thus compatible with the electronic device. The cover is removed from the housing to inspect the cord. The cord distal end and the cord proximal end should be fully retracted in the cord winding differential member. The electronic device is then inserted into the electronic device cover. In one embodiment, the electronic device is slidably connected to the electronic device cover. The cover is then connected over the housing to protect the cord from damage, and to provide a more aesthetic appearance. The fit should be flush and smooth. In one embodiment, a clip that is located externally on the housing fastens to the user's belt or pocket for extra portability. If the electronic device is utilized as an audio device, the user extends the cord proximal end from the housing by pulling on the proximal communication module, which could be a pair of ear buds in this case. The cord distal end is then extended and attached to a port in the electronic device, most likely a female socket. The user will notice as the cord proximal end extends at a faster rate than the cord distal end. The term "rate," as used herein, indicates that more of the proximal end will extend in comparison to the distal end when both ends are being extended from the cover with the same or substantially the same force. This is advantageous because the cord proximal end has attached proximal communication devices such as headphones and ear buds that must extend farther to reach the ears, whereas the cord distal end must simply attach to the electronic device.

The user also utilizes the communication device inside the electronic device cover for searching the internet, receiving or sending a phone call, text message, email, or other form of communication; and of course initiating communications is also possible. One novel feature of the electronic device cover is that when the cord proximal end or the cord distal end is extracted, the phone call is connected; whereas when the cord proximal end or the cord distal end are retracted the phone call disconnects. After the user finishes utilizing the distal communication module and the proximal communication module, the user simply tugs at the cord proximal end, or depresses a button, and the internal cord winding differential member retracts the proximal communication module. This event automatically causes the cord distal end to retract.

Although the invention is illustrated and described herein as embodied in an electronic device cover with retractable communication modules, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the housing. The term "wheel" should be understood to indicate any shape that can rotate and does not necessarily imply or require a round shape.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
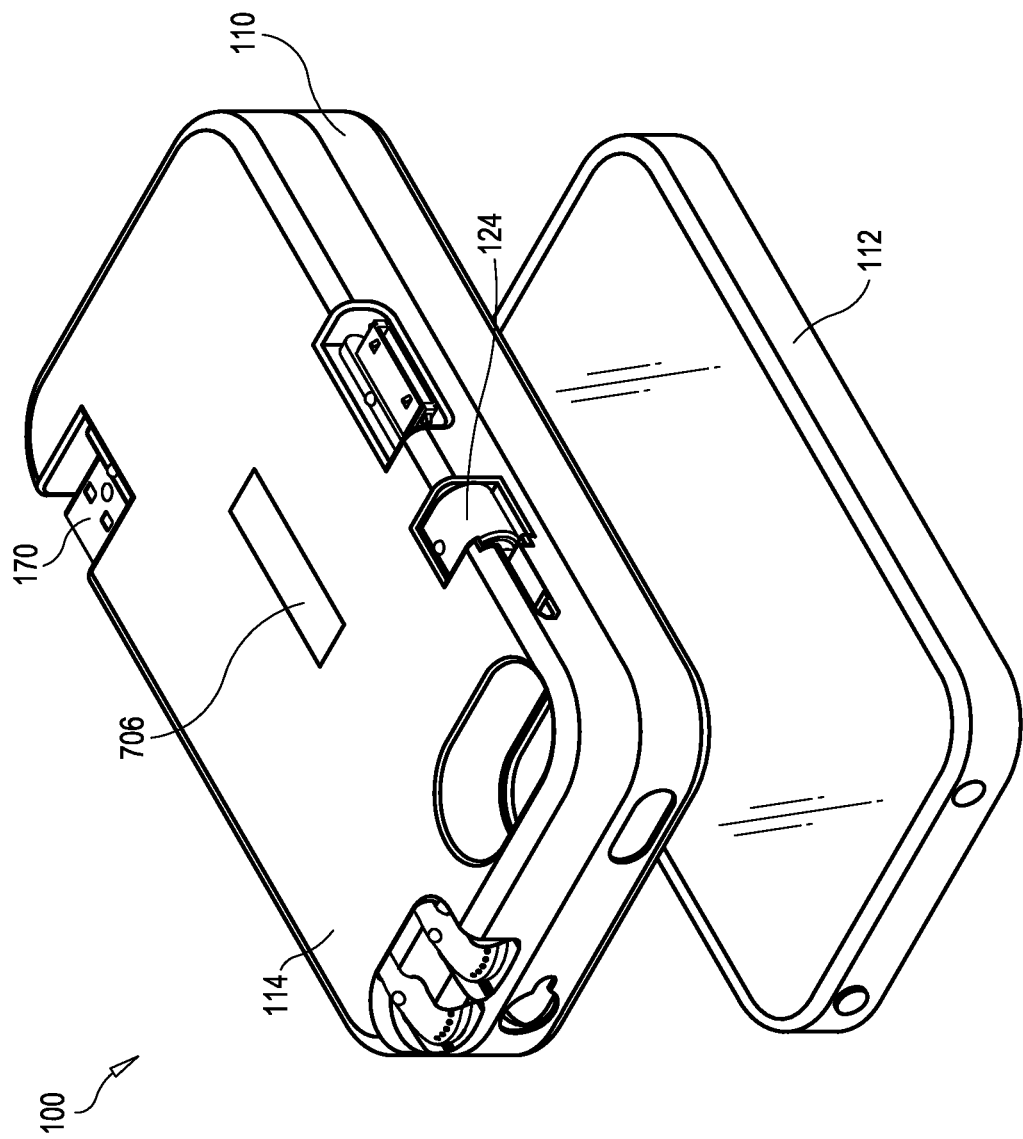
FIG. 1 is a perspective view of an electronic device cover assembly with an electronic device, and communication modules of a pair of cords partially exposed by the cover in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient protective cover for an electronic device that extends and retracts a plurality of audio and data transfer modules at varying speeds and lengths through the use of internal differentials.

Referring first to FIG. 1, an embodiment of the electronic device assembly 100 provides a housing 110. The housing 110 is shaped and configured to receive and hold a variety of different electronic device 112 types and models, such as portable devices used to download and play music, video, and search the internet; and portable digital electronic devices used to send and receive phone calls, personal digital assistant devices, and the like. The housing 110 easily engages with and extricates from the electronic device 112 by sliding, clamping, or utilizing fasteners. The housing 110 can be of a rigid material such as plastic, aluminum, polycarbonate, or any other material of similar extrusion that protects from physical damage due to rugged physical contact, water, contaminants, corrosion and the like. The housing 110 may also have a soft rubber-like liner to hold the electronic device 112 in the cover without shifting. It will be pliable for electronic device's 112 insertion and provides an additional level of protection through shock absorption beyond the rigid outer shell. In one embodiment, the housing 110 includes at least one aperture 810 (shown in FIG. 8) for facilitating the disengagement of the electronic device 112 from the electronic device assembly 100, wherein a rod, pencil, or other similar tool passes through the at least one aperture, exerting sufficient force on the electronic device 112 for disengagement from the housing 110.

Those skilled in the art can appreciate that, while the housing 110 is generally universally dimensioned to receive myriad assortments of the electronic devices 112, there are a variety of different housings 110 to accommodate the different types and models of the electronic devices 112 which are within the scope of the present invention.

Figure 2:
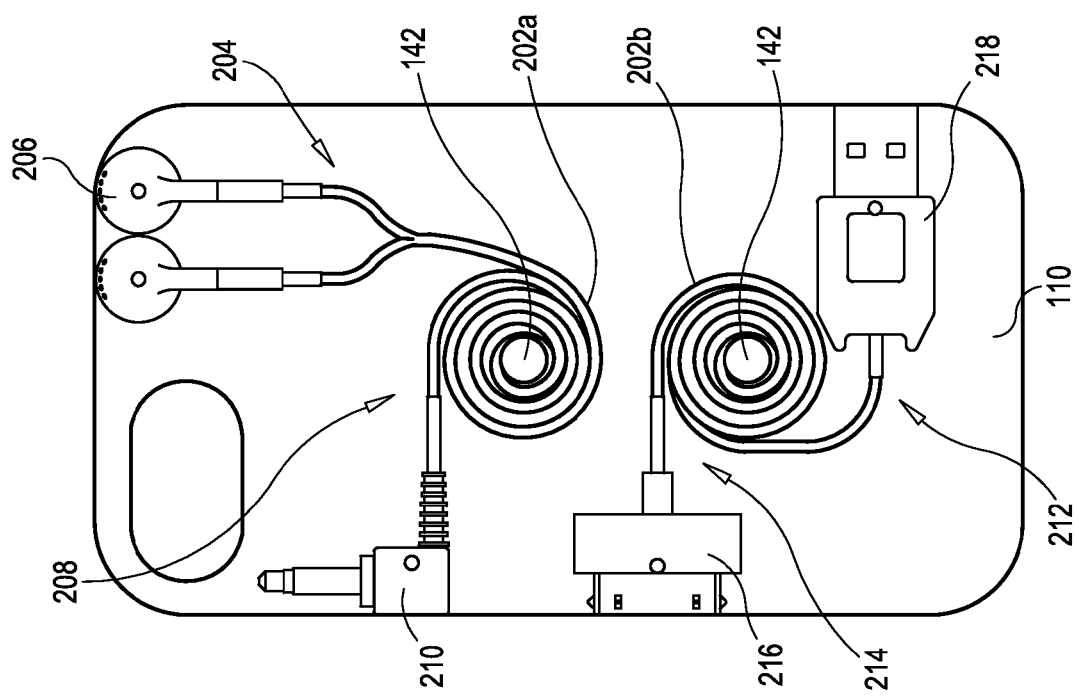
FIG. 2 is a top plan view of the electronic device cover assembly of FIG. 1 with the cover removed and exposing the communication cords, which are engaged with a corresponding pair of extension/retraction members in accordance with the present invention.

A cover 114 removably engages the perimeter edges of the housing 110. In one embodiment, the cover 114 snaps on to the housing 110; however the fitting could be slidable or assisted with a fastener. FIG. 2 shows the present invention with the cover 114 removed and a comparison between FIGS. 1 and 2 illustrates that, when installed, the cover 114 protects one or more cords 202a-n in the housing 110 from physical damage, water, corrosion, and the like. It should be noted that the element designator "a", as used herein, represents 1 and "n" represents any number between zero and infinity. Therefore, the number of cords 202a-n is not limited to any particular quantity of cords, but is generally envisioned to be one or two. In the particular embodiment shown in FIG. 2, first and second cords, 202a and 202b, are shown. Each cord 202a and 202b provides communications for a user when the user connects one or more of the cords 202a-n within the electronic device cover 100 to the electronic device's 112 external power and data sources.

The first cord 202a has a distal end 204 that includes a distal communication module 206, such as a headpiece, an earphone/ear bud, two earphones, a small headset, headphones with small microphone so a user can answer calls, and the like. The first cord 202a has a proximal end 208 that includes a proximal communication module 210 such as an energy source coupling device or an electronic device coupling device, e.g., as an earphone jack, USB connection, cable plug, host interface receptacle, and the like. However, many other similar types of electronic devices and connections, including those not yet available, are compatible with the present invention.

In the embodiment shown in FIG. 2, a second cord 202b has a distal end 212 with a first connector 218 and a proximal end 214 with a proximal connector 216. The second cord 202b can be, for example, a power cord for electronically coupling the electronic device with the proximal connector 216 to a power source with the distal connector 218. In one embodiment, the proximal connector 216 is a proprietary-type connector designated by one or more particular manufactures of the electronic device and the distal connector 218 is a universal connector, e.g., USB plug, cigarette lighter socket adapter for automobiles, and the like.

Figure 3:
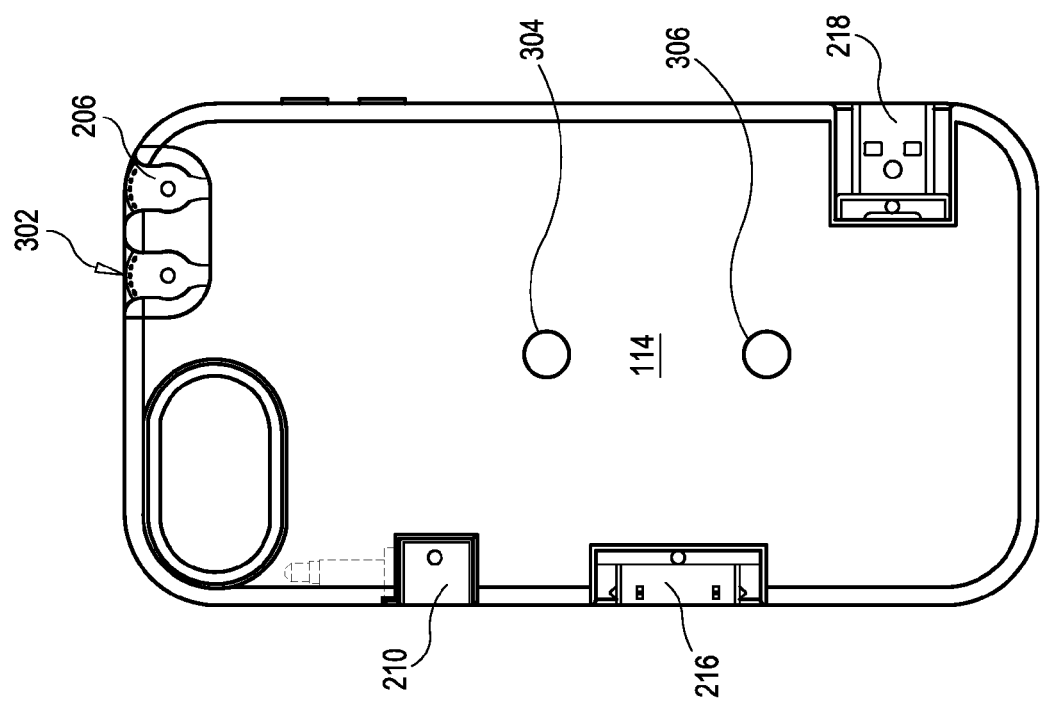
FIG. 3 is a top plan view of the electronic device cover assembly of FIG. 1.

FIG. 3 shows the cover 114 once again attached to the housing 110 to cover the internal components of the electronic device assembly 100. The cover 114 has a plurality of openings, e.g., opening 302, that expose portions of the proximal and distal ends of the cords 202a-n. In this view, the distal communication module 206 and the proximal communication module 210 of the first cord 202a and the proximal connector 216 and the distal connector 218 of the second cord 202b are show in their "parked" positions, where they are partially exposed and graspable by a user of the device. Headphones, headphone jacks, and various similar connectors store flush inside the communication module opening 302, while being easily accessed by the user. In one embodiment, "nubs" are present on and protrude from the headphones 206. FIG. 3 shows an example of nubs on the headphones 206, which contact the user's finger and allow the user to easily apply lateral pressure to the headphones 206 to slide them out of their communication module openings 302.

In accordance with embodiments of the present invention, one or both sets of cords 202a-n in the electronic device assembly 100 are able to extend from and retract back into the cover 114. This ability allows a user of the electronic device 112 to, at all times, be confident that their headphones are available to them for use. No longer does the user need to search for this item and bear the frustration of not remembering where they were last placed. In accordance with an embodiment of the invention, depression of one of a set of buttons 304, 306 causes the cords to retract within the cover 114 when the cords are extended from the housing.

Figure 4:
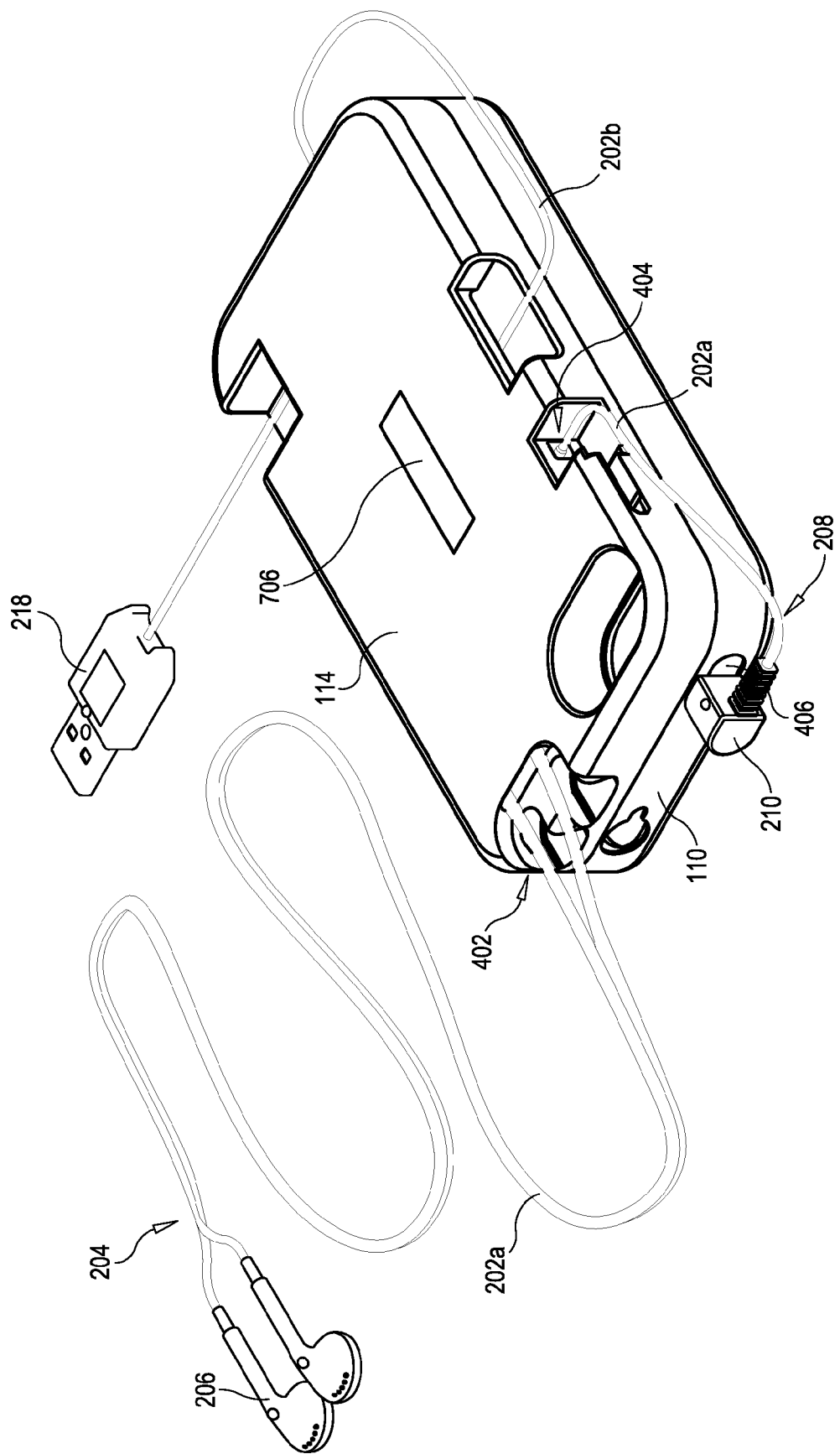
FIG. 4 is a perspective view of the electronic device cover assembly of FIG. 1 with cords partially extended in varying lengths in accordance with the present invention.

FIG. 4 provides a perspective view of the cords 202a and 202b partially extended from the cover 114 of the electronic device assembly 100. In particular, the distal end 204 of the first cord 202a, is extended from the headphone dock 402 of the cover 114 and the proximal portion 208 of the first cord 202a is extended from the plug dock 404 of the cover 114. The proximal communication module 210 at the proximal portion of the first cord 202a is inserted through an opening 406 within the housing 110 and inserted into a communication port of the electronic device housed therein. For example, the proximal communication module 210 is an earphone jack and is plugged into a standard earphone port on a cellular telephone. As is also shown in FIG. 4, the proximal end 208 is not extended from the cover 114 as much as the distal end 204. Because both the cord distal end 204 and the cord proximal end 208 belong, in essence, to the same cord 202, their extensions and retractions must be coordinated. For example, extension of the cord distal end 204 must allow the cord proximal end 208 to simultaneously extend so that the headphone can reach the user's ears, and the jack can also reach the electronic device 112. Advantageously, and for the first time, the present invention provides a novel structure that allows the proximal end of the cords 202a and 202b to automatically extend from and retract into the electronic device assembly 100 at a speed/length that differs from the speed/length of the distal ends of the cords 202a and 202b. The present invention provides several embodiments that accomplish the task of automatically extending/retracting the proximal and distal ends of the cords 202a and 202b at differing speeds/lengths.

Figure 5:
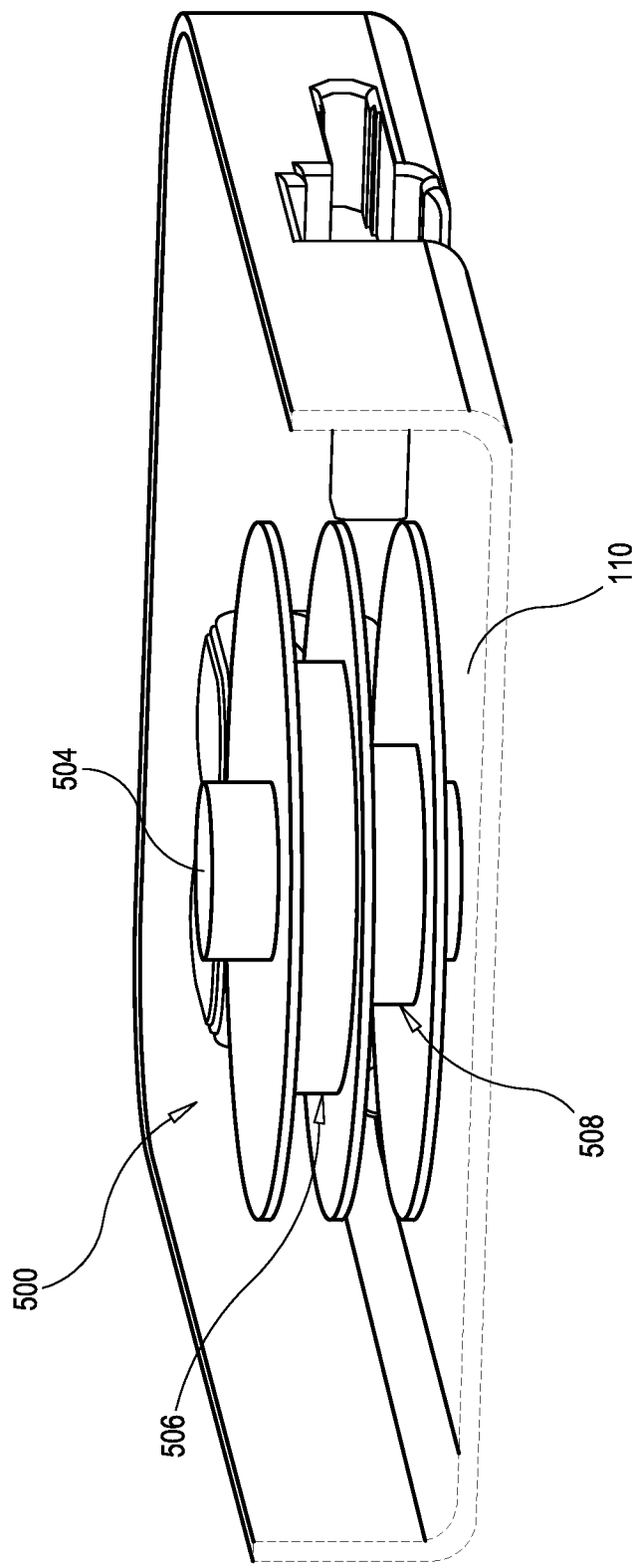
FIG. 5 is a perspective view of an extension/retraction assembly with a first extension/retraction member and a second extension/retraction member having differing diameters and sharing a rotational couple in accordance with the present invention.

As shown in FIG. 5, the present invention includes at least one extension/retraction assembly 500 located within the cover 114. The extension/retraction assembly 500 is configured to extend and retract the cord proximal end 208 and the cord distal end 204 at different angular velocities and lengths. This is possible because of a couple of structural differential embodiments of the extension/retraction assembly 500. The first embodiment, shown in FIG. 5, features an axial pin 504 that is coupled to the housing 110 (or may be coupled to the cover 114). The axial pin 504 supports at least two extension/retraction members 506, 508 that are shown in FIG. 5 as wheels with differing circumferences. The distal end 204 of the first cord 202a (not shown in this view) is wrapped around the first extension/retraction member 506 and the proximal end 208 is wrapped around the second extension/retraction member 508, which has a smaller axial circumference than the first extension/retraction member 506. The different axial circumferences act as a differential and allow the cord distal end 204 to spool off of the first extension/retraction member 506 at a faster angular velocity and, therefore, longer length, than the proximal end 208 spools off of the second extension/retraction member 508. Conversely, the cord distal end 204 retracts at a faster angular velocity and length than the angular velocity and length of the proximal end 208.

Figure 6:
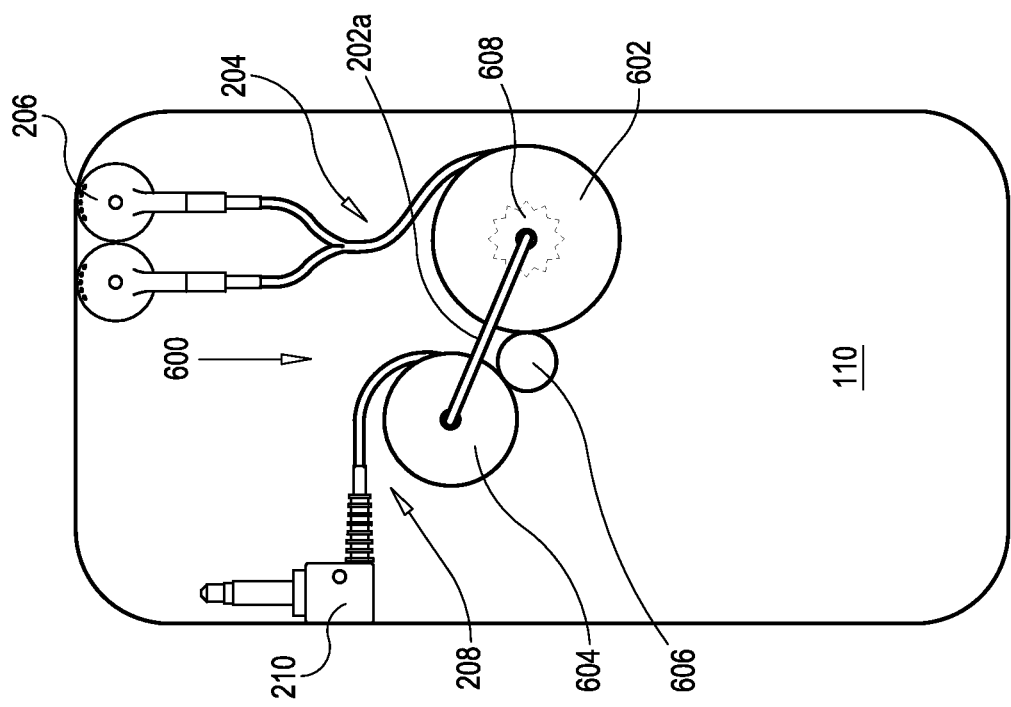
FIG. 6 is a plan view of an extension/retraction assembly with a first extension/retraction member and a second extension/retraction member coupled to each other through a coupling wheel in accordance with the present invention.

As shown in FIG. 6, a second structural embodiment of an extension/retraction assembly 600 creates a differential effect between the cord distal end 204 and the cord proximal end 208 and includes two extension/retraction members 602 and 604. A first extension/retraction member 602 is mechanically rotationally coupled to a second extension/retraction member 604 through a coupling wheel 606. The first extension/retraction member 602 has a first circumference and the second extension/retraction member 604 has a second circumference, where the first circumference is greater than the second circumference. When the first extension/retraction member 602 is rotated, for example, when the user pulse the headphones 206 away from the housing 110, the first extension/retraction member 602 causes the coupling wheel 606 to rotate. Because the coupling wheel 606 is in rotational contact with both the first extension/retraction member 602 and the second extension/retraction member 604, the second extension/retraction member 604 is caused to rotate in response to the earphones 206 being pulled. Also, because the circumference of the first extension/retraction member 602 is larger than the circumference of the second extension/retraction member 604, the second extension/retraction member 604 rotates at a slower velocity than does the first extension/retraction member 602. As a result, the distal end 204 of the cord 202a unspools faster than does the proximal end 208 of the cord 202a. A spiral torsion member 608 can be provided that, when activated, causes the extension/retraction members 602, 604 to rotate in a direction that winds the distal 204 and proximal 208 ends of the cord 202a back onto the extension/retraction members 602, 604, also at different rates from each other.

Figure 7:
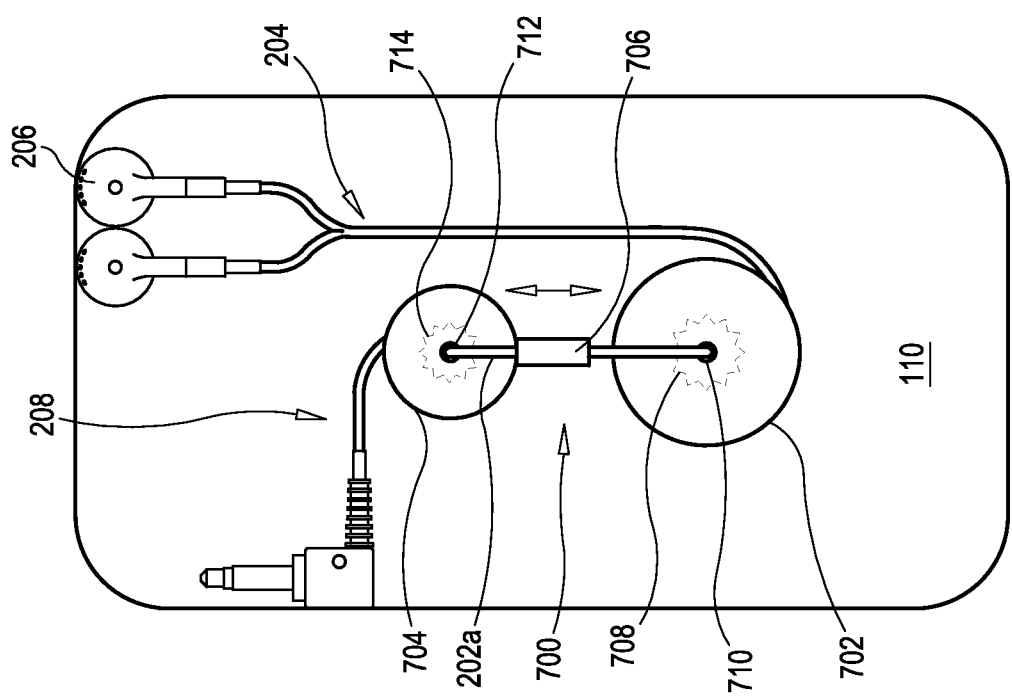
FIG. 7 is a plan view of an extension/retraction assembly with a first extension/retraction member and a second extension/retraction member and a switch controlling the rotation of either member in accordance with the present invention.

A third structural embodiment of an extension/retraction assembly 700 that creates a differential effect between the cord distal end 204 and the cord proximal end 208 includes two extension/retraction members 702 and 704 shown in FIG. 7. A first extension/retraction member 702 is wound with the distal end 204 of the cord 202 and rotates upon a first pin 710. A second extension/retraction member 704 is wound with the proximal end 208 of the cord 202 and rotates upon a second pin 712. The first extension/retraction member 702 has a spiral torsion member 708 (or spring/ratchet mechanism) that allows the distal end 204 of the cord 202 to be extended and automatically retracted back upon the first extension/retraction member 702. If the spiral torsion member 708 includes a ratchet mechanism, the distal end 204 of the cord 202 is able to be extended and, when let go, will not be withdrawn back onto the extension/retraction member 702 until the distal end 204 has been extended a minimum distance. Ratchet mechanisms are well known in the art, such as, for example, seatbelts in cars.

The second extension/retraction member 704 also has a spiral torsion member 714 (or spring/ratchet mechanism) that allows the proximal end 208 of the cord 202 to be extended and automatically retracted back up on the second extension/retraction member 704. In this embodiment, the first extension/retraction member 702 and the second extension/retraction member 704 move independently of one another. Here, a user can extend the distal end 204 from the housing 110 as far as they like and can then independently extend the proximal end 208 from the second extension/retraction member 704 as far as they like. Of course the proximal end 208 only needs to move a small distance while the distal end 204 will usually be extended a much larger distance to reach the ears of the user.

In yet another embodiment, which is also shown in FIG. 7, between the first extension/retraction member 702 and the second extension/retraction member 704 is a sliding switch 706 that selectively engages either the first extension/retraction member 702 or the second extension/retraction member 704 and prevents either of those members from spinning/rotating. Through this embodiment, a user can select which end (the proximal 208 or distal 204) of the cord 202 he/she will pull from and/or can select which extension/retraction member 702, 704 the spring force can cause to rotate. For example, once the proximal communication module 210 of the cord 202 is extended and inserted within the communication port of the electronic device (see FIG. 4), a spring force applied by spiral torsion member 714 can be applied to the proximal end 208 of the cord 202 so that the cord 202 is pulled rather tight and stays against the body of the electronic device assembly 100. Because a constant spring bias force applied to the distal end 204, which includes the headphones 206, would be rather annoying to the user, the switch 706 can be slid in a direction that engages the first extension/retraction member 702 and holds it in a rotational position selected by the user. When the user is finished with the headphones 206 and would like to retract them into the electronic device assembly 100, the user need only manipulate the switch 706 so that the bias force applied by the spiral torsion member 708 causes the wheel 702 to rotate upon the pin 710.

Figure 8:
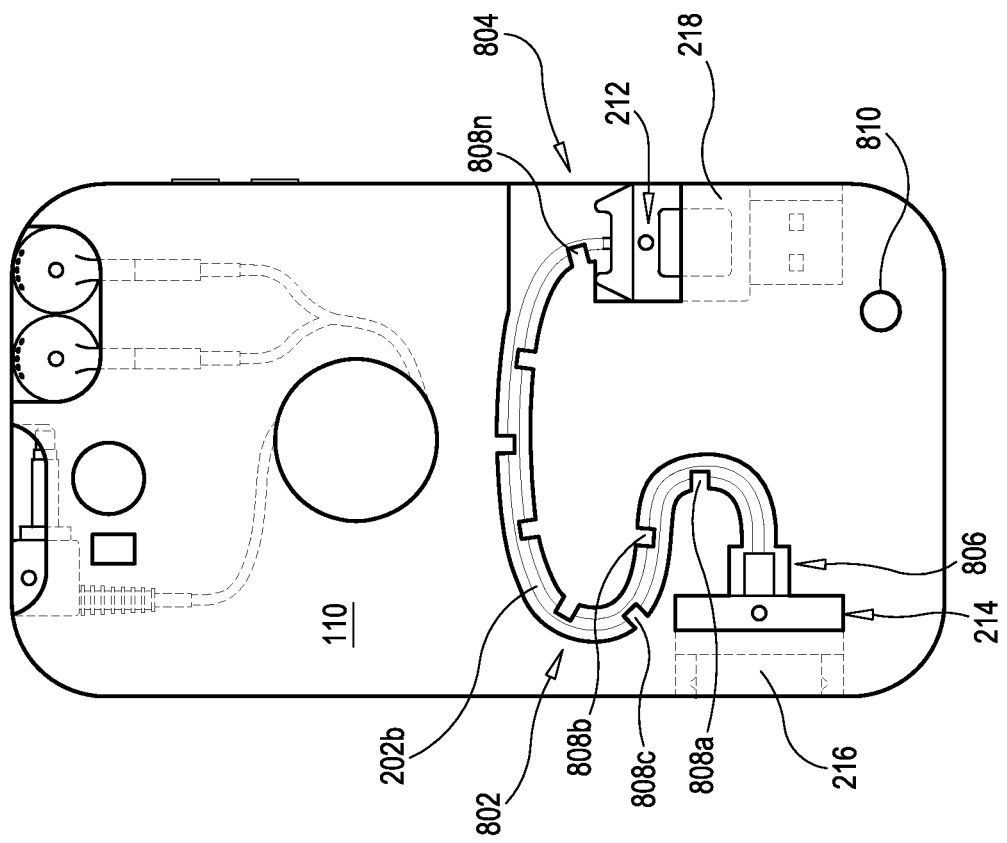
FIG. 8 is a top plan view of the electronic device cover with a cord winding differential member and a tortuous groove both storing their respective cords in accordance with the present invention.

There is also a further embodiment of the electronic device cover 100 shown in FIG. 8 that utilizes a tortuous groove 802 inside the outer surface of the housing 110 to store, extend, and retract the second cord 202b rather than utilizing another cord winding differential member, 500, 600, 700. The tortuous groove 802 is fabricated within the housing 110 construct. The tortuous groove 802 includes a groove distal opening 804 and a groove proximal opening 806 where the respective communication modules 218, 216 are located for easy accessibility. The tortuous groove 802 further includes a plurality of cord restraining members 808a-n positioned along the length of the tortuous groove 802 for restraining the cord 202b securely along the tortuous groove 802. The plurality of cord restraining members 808a-n press the cord 202b against the inner surface of the tortuous groove 802 to create resistance. The cord distal end 218 and the cord proximal end 214 extend and retract against the plurality of cord restraining members 808a-n with sufficient resistance to prevent them from loosely falling out of the tortuous groove 802.

An electronic device cover assembly 100 has been described that includes a first portion 110 shaped to accept and removably couple to an electronic device and a second portion 114 adjacent the first portion 110 that includes a cord extension/retraction assembly 500, 600, 700, which includes at least a first extension/retraction member 506 and a cord 202a engaged with the first extension/retraction member 506 and having a distal portion 204 and an opposing proximal portion 208, wherein the extension/retraction member 506 is sized so that a movement of the first extension/retraction member 506 moves the distal portion 204 of the cord 202a at a first rate and moves the proximal portion 208 of the cord 202a at a second rate, where the first rate and second rate are not equal.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An electronic device cover assembly comprising:
a first portion shaped to accept and removably couple to an electronic device; and
a second portion adjacent the first portion that includes a cord extension/retraction assembly including:
a first extension/retraction member;
a second extension/retraction member; and
a continuous cord having a distal portion including an earphone communication module, an opposing proximal portion including an electronic device coupling module, and a cord length separating the distal and opposing proximal portions, the cord engaged with both the first extension/retraction member and the second extension/retraction member along the cord length,
wherein the extension/retraction member is sized so that a movement of the first extension/retraction member moves the distal portion of the cord at a first rate and moves the proximal portion of the cord at a second rate, where the first rate and second rate are not equal.

2. The electronic device cover assembly according to claim 1, wherein:
the first extension/retraction member is a first wheel coupled to the distal portion of the cord; and
the extension/retraction assembly includes a second wheel coupled to the proximal portion of the cord.

3. The electronic device cover assembly according to claim 2, wherein:
the first wheel has a first diameter and the second wheel has a second diameter and the first diameter and the second diameter are not equal.

4. The electronic device cover assembly according to claim 2, wherein:
the first wheel and the second wheel are coaxial.

5. The electronic device cover assembly according to claim 2, wherein:
the first wheel and the second wheel move independent from one another.

6. The electronic device cover assembly according to claim 1, wherein the cord comprises:
a set of headphones.

7. The electronic device cover assembly according to claim 1, wherein:
movement of the distal portion of the cord away from the extension/retraction assembly causes movement of the proximal portion of the cord away from the extension/retraction assembly.

8. An electronic device cover assembly comprising:
a first portion shaped to accept and removably couple to an electronic device; and
a second portion adjacent the first portion and including a cord extension/retraction assembly having:
a first extension/retraction member;
a second extension/retraction member;
a continuous communication cord having a distal portion including an earphone communication module, an opposing proximal portion including an electronic coupling module, and a cord length separating the distal and opposing proximal portions, the cord engaged with both the first extension/retraction member and the second extension/retraction member along the cord length; and
a rotational couple between the first extension/retraction member and the second extension/retraction member so that:
a rotation of the first extension/retraction member moves the distal portion of the cord at a first rate;
a rotation of the first extension/retraction member rotates the second extension/retraction member; and
a rotation of the second extension/retraction member moves the proximal portion of the cord at a second rate, where the first rate and second rate are not equal.

9. The electronic device cover assembly according to claim 8, wherein:
the first extension/retraction member is a first wheel with a first diameter; and
the second extension/retraction member is a second wheel with a second diameter and the first diameter and the second diameter are not equal.

10. The electronic device cover assembly according to claim 9, wherein:
the first wheel and the second wheel are coaxial.

11. The electronic device cover assembly according to claim 8, wherein:
the rotational couple is a coupling wheel mechanically coupled to the first extension/retraction member and the second extension/retraction member.

12. The electronic device cover assembly according to claim 8, further comprising:
a switch with at least one position that inhibits rotational movement of the first extension/retraction member.

13. The electronic device cover assembly according to claim 8, wherein the cord comprises:
a set of headphones.

14. The electronic device cover assembly according to claim 8, wherein:
movement of the distal portion of the cord away from the extension/retraction assembly causes movement of the proximal portion of the cord away from the extension/retraction assembly.

15. An electronic device cover assembly comprising:
a housing, the housing shaped to accept and removably couple to an electronic device;
a cover for removably engaging with the housing;
a continuous cord for providing communications, the cord defined by a cord distal portion, the cord distal portion comprising an earphone communication module, a cord proximal portion, the cord proximal portion comprising an electronic device coupling module, and a cord length separating the distal and opposing proximal portions; and
a cord winding differential member configured to extend and retract the cord proximal portion and the cord distal portion at different angular velocities and lengths, and including:
a first extension/retraction member engaged with the cord distal portion along the cord length;
a second extension/retraction member engaged with the cord proximal portion along the cord length;
a rotational couple between the first extension/retraction member and the second extension/retraction member so that:
a rotation of the first extension/retraction member moves the distal portion of the cord at a first rate;
a rotation of the first extension/retraction member rotates the second extension/retraction member; and
a rotation of the second extension/retraction member moves the proximal portion of the cord at a second rate, where the first rate and second rate are not equal.

16. The electronic device cover assembly according to claim 15, wherein the housing comprises a plurality of cord winding differential members and a plurality of cords.

17. The electronic device cover assembly according to claim 15, wherein the distal communication module is a set of headphones.

18. The electronic device cover assembly according to claim 15, wherein the distal communication module is an electronic device coupling module.

19. The electronic device cover assembly according to claim 15, wherein the distal communication module is a Universal Serial Bus.

* * * * *